United States Patent
Brown

(10) Patent No.: US 7,526,436 B2
(45) Date of Patent: Apr. 28, 2009

(54) SYSTEM AND METHOD FOR COMPENSATING AN ARTIST WITH ARTIST-PERFORMED ADVERTISING

(76) Inventor: Scott W. Brown, 8104 Ravello Ridge Cove, Austin, TX (US) 78735

( * ) Notice: Subject to any disclaimer, the term of this patent is extended or adjusted under 35 U.S.C. 154(b) by 0 days.

(21) Appl. No.: 11/736,243

(22) Filed: Apr. 17, 2007

(65) Prior Publication Data

US 2008/0065482 A1 Mar. 13, 2008

Related U.S. Application Data

(60) Provisional application No. 60/824,984, filed on Sep. 8, 2006.

(51) Int. Cl.
*G06F 17/60* (2006.01)
(52) U.S. Cl. ...................................................... 705/14
(58) Field of Classification Search ..................... 705/14
See application file for complete search history.

(56) References Cited

U.S. PATENT DOCUMENTS

| | | | |
|---|---|---|---|
| 6,609,105 B2 | 8/2003 | Van Zoest et al. | |
| 6,632,992 B2 | 10/2003 | Hasegawa | |
| 7,054,831 B2 | 5/2006 | Koenig | |
| 2002/0178082 A1* | 11/2002 | Krause et al. | 705/26 |
| 2003/0014310 A1 | 1/2003 | Jung | |
| 2005/0267813 A1 | 12/2005 | Monday | |
| 2006/0229940 A1* | 10/2006 | Grossman | 705/14 |
| 2007/0061194 A1 | 3/2007 | Kikuchi | |
| 2008/0097825 A1* | 4/2008 | Leach et al. | 705/10 |

FOREIGN PATENT DOCUMENTS

JP 2002083232 A * 3/2002

* cited by examiner

*Primary Examiner*—Pierre E Elisca
(74) *Attorney, Agent, or Firm*—Louis Ventre, Jr.

(57) ABSTRACT

A system and method for promoting artistic creation and compensation therefor includes a first step of accepting payment from an advertiser to have an artist perform a message in the voice of the artist within an entertainment production of the artist; a second step of creating an entertainment production by the artist wherein the message is integrated into the entertainment production; a third step of converting the entertainment production to an electronically readable file; a fourth step of enabling consumer download of the electronically readable file using the Internet; and, a fifth step of paying the artist for a consumer download of the electronically readable file.

9 Claims, 1 Drawing Sheet

SYSTEM AND METHOD FOR COMPENSATING AN ARTIST WITH ARTIST-PERFORMED ADVERTISING

CROSS-REFERENCE TO RELATED APPLICATIONS

Pursuant to 35 U.S.C. section 119(e), the present invention claims the benefit of the filing date of U.S. provisional application 60/824,984 filed 8 Sep. 2006, the text of which is included by reference herein.

FIELD OF INVENTION

In the field of entertainment, a method for promoting artistic creation and compensation therefor employing embedded advertising performed in the voice of the artist and distributed over the Internet.

DESCRIPTION OF PRIOR ART

This invention serves artists, consumers and advertisers. It solves problems involving artist compensation for entertainment products, consumer use of entertainment products, and effective advertising means.

The invention has application to artists of all kind who create entertainment products, such as songs, films, and electronic games. The music industry is used herein as the prime example for this invention because it is probably the largest market for application of the invention. Musicians are currently getting the short end of the compensation for music they create. The present invention is a new paradigm for musicians.

Today, almost all companies compute musician royalties as a percentage of the record's suggested retail list price. From this price, the company deducts expenses, such as: packaging, free goods, etc. Also deducted are holdbacks or reserves against returns and allowances for breakage, etc. The compensation deals offered musicians are enormously complex and one-sided not in favor of the musician.

Artists have been forced to operate in a system where they often pay 95% to intermediaries to distribute their music to the consumer. These intermediaries range from record label, business manager, agent, personal manager, attorney, and others. The record labels, in particular, strictly control distribution and production.

It is well known that artists are increasingly frustrated with the entertainment business because they are often the last to be paid proceeds from the sale of their work. The present system creates a not uncommon situation wherein new artists, who sell a million or more copies of a product, receive only a meager payment for their work. There is a need, therefore, for an artist compensation method that expands the revenue pie through new services commensurate with the digital entertainment market.

The present invention is a new artist compensation method that facilitates more direct distribution by an artist to consumers eliminating numerous intermediaries and costs. Using the preferred method of the invention, the artist is compensated for each download of their product. Thus, the artist is paid "off the top" receiving a percentage for monies received from services, removing the complexity of the compensation equation and eliminating one-sided agreements that all too often short change the artist.

An embodiment of the invention adds an artist-fan interactive service. The interactive service creates potential to expand the artist's electronic fan base. It enhances consumer demand for the artist's product and ancillary products by using the special connection between artist and fan, one that exists in few other third party relationships, and is otherwise not being utilized to its potential in existing methods.

The invention responds to the natural inclinations of consumers without the threat of legal action or legal intimidation. Today, the Internet offers a world of open social media that permits consumers to circumvent intellectual property rights and download unauthorized copies of an artist's entertainment product. The response of the industry has been to implement digital rights management technical solutions that prevent copying and to force consumers to stop copying by filing legal complaints, using law enforcement prosecution and advertising the results of unauthorized copying to intimidate consumers into compliance with the law of intellectual property rights.

It is clear, however, that resistance to consumer predilections in the Internet age borders on being futile. It also does not exploit the inherent value in these natural tendencies to obtain products at low or no cost. Further, it is nonproductive in threatening to make criminals out of people who might otherwise be profitable consumers. The present invention avoids these problems. Digital rights management and intellectual property enforcement become unnecessary and unimportant because compensation is gained by advertising in the download of an entertainment product. This frees the consumer from legal intimidation and the constraints of illicit copying. Thus, the invention enables consumers to do what they have proven they want, and exploits the profit potential in those consumer predilections.

The invention responds to advertisers, who are the funders of entertainment. Today advertisers spend about $500 billion on advertising, yet less than 3 percent of that amount is spent on the Internet. It is becoming increasingly obvious that traditional advertising means are diminishing in effectiveness because technology, such as digital video recording, is allowing consumers to avoid the ads when viewing the entertainment. Thus, old mass marketing or repurposed print and TV ads are increasingly less rewarding for the advertiser: they are increasingly ignored or TiVoed.

The present invention affords advertisers a new form of advertising that provides sought-after access to an audience that would willingly receive their message, especially because the invention enables relevant messaging. In essence, the advertiser is paying the costs for the file to be delivered to users in exchange for the ability to reach the demographic to which the artist appeals. This ability to target a specific demographic profile is invaluable to advertisers.

Relevant messaging is placed in the context of the entertainment product in the voice of the artist. The message is in essence an additional performance by the artist that is inclined to be welcomed by the consumer, rather than treated like a nuisance to be circumvented if possible. Thus, relevant messaging give the consumer more of the artist and at the same time delivers the advertiser's message.

In addition, because the message is inextricably linked to the production, the advertisement will be heard or seen each time the production is played by the consumer. This results in a high frequency of impressions on the targeted demographic. This high frequency, coupled with the reach of the advertising described above, creates a new and unique advertising method.

An embodiment of the present invention utilizes the potential of the Internet as a social networking platform to develop customer relationships. It employs the entertainment product as a potential doorway to dialogue with consumers about the advertiser's products, which in turn fosters consumer use of the product.

The concept of combining an interactive game with interactive advertising is known in the art. An example is U.S. Pat. No. 7,054,831 wherein such combination enables a seller of merchandise to combine an advertising infomercial with the playing of an interactive game. When a player comes to a decision point in the game, the player is required to select a product from a group of products that is suitable for the next task that the player must accomplish to advance in the game. As a player successfully navigates through the game, product discounts, coupons, etc. are applied toward the purchase of products. While the present invention integrates the advertiser's message into the entertainment product, one important distinction is that the message is incorporated using the voice of the artist of the entertainment production.

The concept of distributing music with an appended advertisement is also known. An example is U.S. Pat. No. 6,632,992, which describes an apparatus for appending an advertisement to a music file when a request is made for the music file. The advertisement is selected from advertisements stored in memory and the file is then sent via a network connection to meet the request. The present invention does not select among various advertisements from those stored in memory, but rather the advertisement is tailored to a specific advertiser. Here again, an important distinction is that with the present invention, the message is incorporated using the voice of the artist of the entertainment production.

The notion of lowering the cost of music by appending advertisements is known. An example is United States Patent Application Publication 20070061114 which describes a device and method for generating commercial-containing music data. It enables music distribution implemented over the Internet to provide music less expensively than in the past or free of charge. The '194 application describes a method of inserting commercial data before or after music data to enable it to be heard whenever music is played. The present invention is distinguished because it does not simply append a commercial message, but rather it incorporates the message in a performance in the voice of the artist.

Finally, the concept of using items displayed during an entertainment program is known. A recent example is United States Patent Application Publication 20050267813, which describes a method and system for marketing items displayed in entertainment programs such as music videos and television programs. Contact information for purchase of a displayed item is presented to the viewer of the entertainment program by a video or audio overlay. The present invention is distinguished in that the artist is engaged to perform the message and not simply display the marketing item in a program. Use of the Internet is also important to the invention so that the artist can be paid for a consumer download of the performance. A broadcast of the performance would be contrary to a capability of compensating the artist upon a download of the program.

Accordingly, the present invention will serve to improve the prior art while serving the interests of artists, consumers and advertisers. It solves problems involving artist compensation for entertainment products. It eliminates the usual intellectual property concerns over uncompensated consumer downloads of entertainment products. And, it provides an effective advertising strategy that entices consumers to listen to the advertisement because the advertising message is performed by the artist.

BRIEF SUMMARY OF THE INVENTION

A system and method for promoting artistic creation and compensation therefor includes a first step of accepting payment from an advertiser to have an artist perform a message within an entertainment production of the artist; a second step of creating an entertainment production by the artist wherein the message is integrated into the entertainment production and communicated by the voice of the artist; a third step of converting the entertainment production to an electronically readable file, wherein the message is necessarily exposed to a consumer who experiences the entertainment production via the electronically readable file; a fourth step of enabling consumer download of the electronically readable file using the Internet; and, a fifth step of paying the artist for a consumer download of the electronically readable file.

DETAILED DESCRIPTION

In the following description, reference is made to the accompanying drawings, which form a part hereof and which illustrate embodiments of the present invention. The drawings and the preferred embodiments of the invention are presented with the understanding that the present invention is susceptible of embodiments in many different forms and, therefore, other embodiments may be utilized and the order of the steps and other operational changes may be made without departing from the scope of the present invention.

Figure 1:
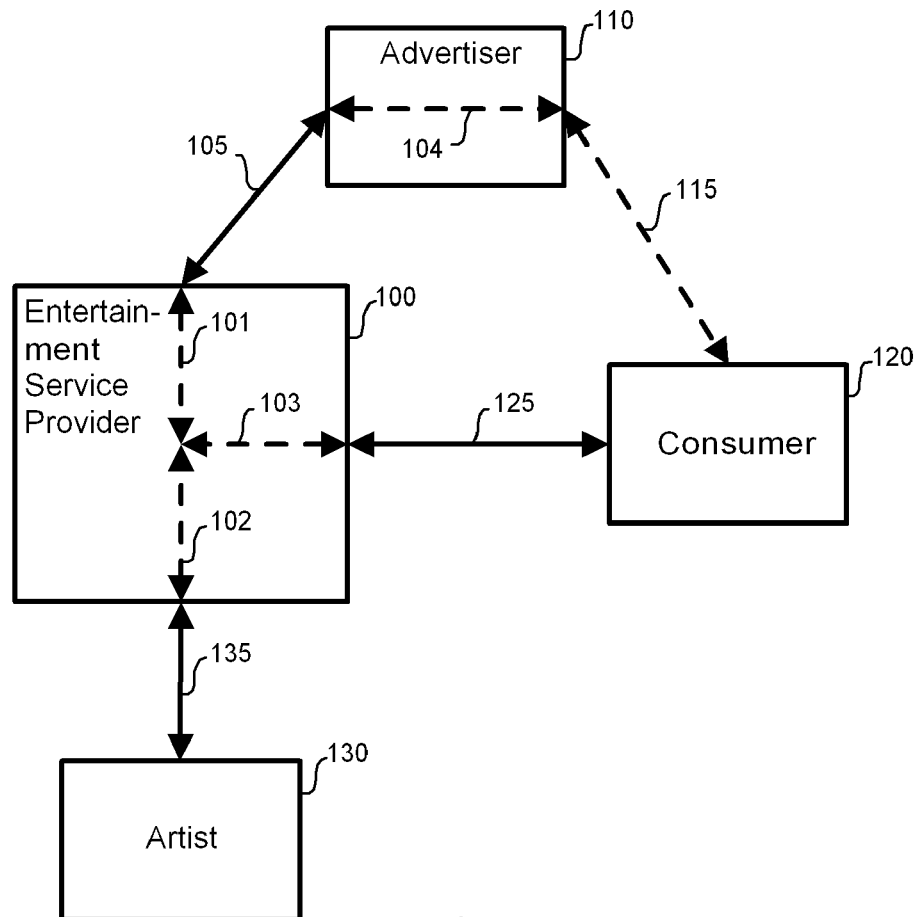
FIG. 1 is a block diagram illustrating preferred embodiments of the invention.

FIG. 1 illustrates the flow of communication between participants in the method when implementing preferred embodiments of the invention. A preferred embodiment is a system and method for promoting artistic creation and compensation for the artistic creation. There are four persons involved in this system and method: the entertainment service provider (110), the advertiser (110), the consumer (110) and the artist (110). The entertainment production is preferably a music production, but may also be an electronic game, or video production by an artist (110).

The entertainment service provider (100) is the person typically implementing the steps of the preferred embodiment. This person implements the first step by accepting payment from the advertiser (111) to have an artist perform in the artist's voice an advertising message within an entertainment production of the artist. The artist preferably sings a short message somewhere within the artist's entertainment production and preferably in the style and manner of the entertainment production. In this step, the double-headed arrow (115) illustrates that communication (115) is between the advertiser (111) and the entertainment service provider (110). Preferably, this step would be implemented with an agreement between the advertiser (110) and the entertainment service provider (110), which would set down the terms of performance of the message in the entertainment production. Preferably, the agreement would involve payment by the advertiser (110) to the entertainment service provider (110) in sufficient amount and at such times as to permit payment by the entertainment service provider (110) to the artist (110) for each download by a consumer of the entertainment production with the message.

The entertainment service provider (110) implements a second step by creating an entertainment production by the artist wherein the message is integrated into the entertainment production and communicated in the voice of the artist (110). The entertainment service provider (110) is the go-between in implementing the creation of the entertainment production with the message. All of the administrative and technical activities needed to produce the entertainment production with the message are preferably handled by the entertainment service provider (110). In this step the double-headed arrow (135) shows communication between the entertainment service provider (100) and the artist (110).

The entertainment service provider (110) implements a third step by converting the entertainment production to an electronically readable file. The conversion process ensures that the entertainment production includes the message in a way that the message is necessarily exposed to a consumer who experiences the entertainment production via the electronically readable file. There are various well known file formats available for electronic music files, one of the most popular being mp3.

The entertainment service provider (110) implements a fourth step by enabling a consumer (110) to download the electronically readable file using the Internet. In this step, the double-headed arrow (115) shows communication between the entertainment service provider (110) and the consumer (110). Preferably, the consumer download is free of charge so that the widest possible distribution of the entertainment production with the message is achieved. This is the most efficient means to spread the message and is expected to be the most rewarding means for all the parties involved. Alternatively, the consumer (110) download may be by means of a small fee to the consumer either on a per download basis or a subscription basis. All such download conditions are within the scope of the invention.

The entertainment service provider (100) implements a fifth step by paying the artist (110) for a consumer (110) download of the electronically readable file. Preferably, the artist (110) is paid for each consumer (110) download of the entertainment production.

In alternative embodiments, the entertainment service provider (110) provides additional services to the parties involved incident to the ability to enable downloads of the entertainment production with the message.

A first such service is providing a rating of the artist and making the rating available to a consumer (110) using the Internet. Preferably, the rating is performed by peers of the artist and/or by consumers of the artist's entertainment production. This would provide additional value to the consumer (110) and the advertiser (111) and would promote the use of an artist (110) that has high ratings.

A second such service is electronically connecting the parties involved for communication and interaction. The Internet permits greater communication between the consumer (110), the artist (110), the advertiser (111), and any other person connected with the entertainment production. Such connection optionally includes hosting an Internet dialogue and chat on the subject of the message from the advertiser (111) included in the entertainment production.

Figure 2:
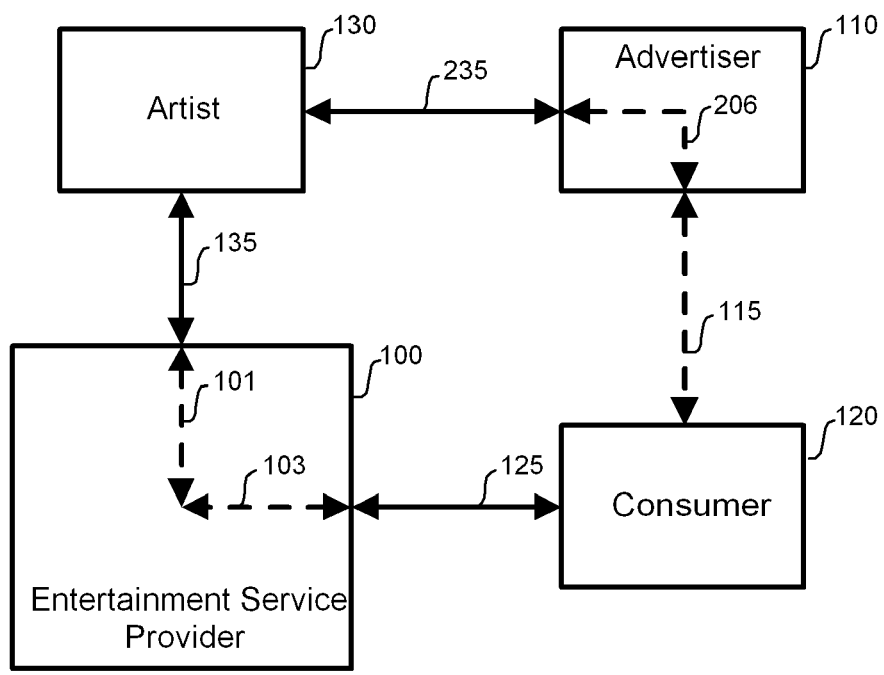
FIG. 2 is a block diagram illustrating alternative embodiments of the invention.

Potential communication and interaction between these parties is illustrated in FIG. 1 and FIG. 2 by the dashed double-headed lines (101), (102), (103), (104), (206) and (111).

The entertainment service provider (110) acts as the means to electronically connect the consumer (110) and the artist (110) for discussion over the Internet, shown by dashed double-headed lines (102) and (103).

Additionally, the entertainment service provider (110) acts as the means to connect the consumer (110) and the advertiser (111) for discussion over the Internet, shown by dashed double-headed lines (101) and (103). The advertiser (111) may also act as the means to connect the consumer (110) with the entertainment service provider (110), shown by dashed double-headed line (114).

Additionally, the entertainment service provider (110) acts as the means to connect the artist (110) and the advertiser (111) for discussion over the Internet, shown by dashed double-headed lines (111) and (112).

Alternatively, the entertainment service provider (110) provides information for a direct electronic communication link between the consumer (110) and the advertiser (111), shown by dashed double-headed line (111). The advertiser (111) may also act as the means to connect the consumer (110) with the artist (110), shown by dashed double-headed line (206).

While the preferred embodiments of the invention presume that the entertainment service provider (110) is the person with whom an advertiser (111) comes to organize the process for including a message within an entertainment production, this does not have to be case. The artist (110) and advertiser (111) can reach an agreement independently of the entertainment service provider and then use the downloading services of the entertainment service provider (110) to manage the consumer access to the entertainment product.

FIG. 2 illustrates this alternative embodiment, providing for the case where an advertiser (110) and an artist (110) link up separately from the entertainment service provider (110). The artist (110) and advertiser (111) agree to produce entertainment production containing an integrated message from the advertiser (111) in the voice of the artist (110). For this embodiment a direct electronic communication link is made between the artist (110) and the advertiser (110), as shown by dashed double-headed line (235)

This alternative embodiment therefore involves a method for compensating the artist (110) for an entertainment production and distributing the entertainment production to consumers (110) wherein the artist (110) is engaged directly by an advertiser (111).

For this embodiment, the entertainment service provider performs a first step of entering an agreement to electronically distribute an electronically readable file containing an artist's (110) entertainment production with the message from an advertiser.

The entertainment service provider performs a second step of enabling consumer download of an electronically readable file via the Internet.

The entertainment service provider performs a third step of paying the artist for a consumer download of the electronically readable file.

In an alternative embodiment, the entertainment service provider (110) also performs the step of converting the entertainment production to an electronically readable file, wherein the message is necessarily exposed to a consumer who experiences the entertainment production via the electronically readable file. For this embodiment, the artist (110) may have only taped a music production and thus would need the services of the entertainment service provider (110) to convert the music to an electronically readable file.

The disclosure herein is to be considered as an exemplification of the principles of the invention and is not intended to limit the broad aspect of the invention to the embodiments illustrated. Thus, the scope of the invention is determined by the appended claims and their legal equivalents rather than by the examples given.

What is claimed is:

1. A method for promoting artistic creation and compensation therefor comprising the steps of:
   (a) accepting payment from an advertiser to have an artist perform a message in the voice of the artist within an entertainment production of the artist;
   (b) creating the entertainment production by the artist wherein the message is integrated into the entertainment production and communicated in the voice of the artist;
   (c) converting the entertainment production to an electronically readable file using a computer, wherein the message is necessarily exposed to a consumer who experiences the entertainment production via the electronically readable file;
   (d) enabling consumer download of the electronically readable file using the Internet; and,
   (e) paying the artist for a consumer download of the electronically readable file.

2. The method of claim 1 wherein the entertainment production is selected from a group consisting of music, electronic game, and video.

3. The method of claim 1 wherein enabling consumer download is without fee to the consumer.

4. The method of claim 1 wherein enabling consumer download is with a fee to the consumer.

5. The method of claim 1 further comprising the step of rating the artist and making the rating available to a consumer using the Internet, wherein the rating is performed by people selected from a group consisting of
   (a) peers of the artist; and,
   (b) consumers of the artist's entertainment production.

6. The method of claim 1 further comprising the step of connecting electronically for communication and interaction using the Internet, the consumer, and people connected to the entertainment production, such people selected from a group consisting of:
   (a) the artist;
   (b) any person included in the entertainment production; and,
   (c) the advertiser.

7. The method of claim 6 further comprising the step of hosting an Internet dialogue and chat on the subject of the message from the advertiser.

8. A method for compensating an artist comprising the steps of:
   (a) producing an entertainment production wherein the artist is engaged directly by an advertiser to produce entertainment production containing an intergrated message from the advertiser wherein the message is communicated in the voice of the artist;
   (b) entering an agreement to electronically distribute an electronically readable file containing an artist's entertainment production with the message from an advertiser;
   (c) enabling consumer download of the electronically readable file via the Internet; and,
   (d) paying the artist for a consumer download of the electronically readable file using a computer.

9. The method of claim 8 further comprising the step of converting the entertainment production to an electronically readable file, wherein the message is necessarily exposed to a consumer who experiences the entertainment production via the electronically readable file.

* * * * *